(12) United States Patent
Diard (10) Patent No.: US 8,938,127 B2
(45) Date of Patent: Jan. 20, 2015

(54) HYBRID ENCODING/DECODING FOR REMOTE GAMING

(71) Applicant: NVIDIA Corporation, Santa Clara, CA (US)

(72) Inventor: Franck R. Diard, Saint-Contest (FR)

(73) Assignee: NVIDIA Corporation, Santa Clara, CA (US)

( * ) Notice: Subject to any disclaimer, the term of this patent is extended or adjusted under 35 U.S.C. 154(b) by 132 days.

(21) Appl. No.: 13/622,315

(22) Filed: Sep. 18, 2012

(65) Prior Publication Data

US 2014/0079327 A1 Mar. 20, 2014

(51) Int. Cl.
*G06K 9/36* (2006.01)
*G06K 9/46* (2006.01)

(52) U.S. Cl.
USPC .......................................................... 382/232

(58) Field of Classification Search
USPC ......................................... 382/232, 233, 234
See application file for complete search history.

(56) References Cited

U.S. PATENT DOCUMENTS 6,449,639 B1 * 9/2002 Blumberg ...................... 709/217
2006/0050971 A1 * 3/2006 Page et al. ..................... 382/232

\* cited by examiner

*Primary Examiner* — Phuoc Tran
(74) *Attorney, Agent, or Firm* — Patterson & Sheridan, LLP (57) ABSTRACT

Rendered image data is encoded by a server computing device and transmitted to a remote client device that executes an interactive application program. The client device decodes and displays the image data and, when the user interacts with the application program, the client device provides input control signals to the server computing device. When input control signals are received by the server, the latency incurred for encoding and/or decoding the image data is reduced. Therefore, the user does not experience inconsistencies in the frame rate of images displayed on the client when the user interacts with the application program. The reduction in latency is achieved by dynamically switching from a hardware implemented encoding technique to a software implemented encoding technique. Latency may also be reduced by dynamically switching from a hardware implemented decoding technique to a software implemented decoding technique.

20 Claims, 7 Drawing Sheets

HYBRID ENCODING/DECODING FOR REMOTE GAMING

BACKGROUND OF THE INVENTION

1. Field of the Invention

The present invention generally relates to a server-client system and more specifically to encoding and decoding transmissions for remote gaming.

2. Description of the Related Art

Conventional server-client systems either encode image data on a server or simply access image data that has already been encoded for transmission to a client. The client then decodes and displays the image data. A typical scenario employs these conventional server-client systems for playback-type applications, such as video-on-demand applications.

A conventional server-client system is able to maintain a frame rate of 60 frames per second when image data is generated and encoded by the server, transmitted from the server to the client, and then decoded and then displayed by the client. While a throughput of 60 frames per second can be maintained, the latency incurred from the time the image data is generated by the server to the time the image data is displayed by the client can be significant. However, in conventional systems, a user viewing images displayed on the client device does not perceive these types of latencies once the playback of the content has started and is maintained at 60 frames per second.

Playback-oriented applications that are implemented on client devices to access content from server machines allow limited opportunities for a client to provide control inputs to a server in a conventional server-client system. However, control inputs such as pause, play, fast-forward, and rewind expose the above-mentioned latencies when the playback mode of the content provided by the server changes. Although users typically expect to experience some latencies when the playback mode of content changes, when a user plays an interactive game application on a client device that accesses content from a server machine, any latency that reduces the frame rate is undesirable. Unfortunately, latencies are exposed whenever an input provided by the user impacts the image data that is generated by the server.

One reason that such latencies are exposed to users of interactive gaming applications is that the encoding and decoding techniques implemented by the conventional server-client system are designed to satisfy a particular frame rate for the remote playback of content. The encoding and decoding techniques do not also minimize latency for encoding, transmitting, and decoding image data that satisfies the needs of a remote interactive gaming application. Therefore, a user playing an interactive game application on a remote client experiences slowing of the frame rate, i.e., the latency is exposed, whenever the user provides an input control to the game application.

Accordingly, what is needed in the art is an approach that reduces the latencies experienced by users when interacting with or accessing gaming content being provided by server machines in server-client systems.

SUMMARY OF THE INVENTION

One embodiment of the present invention sets forth a system and method for encoding image data for transmission to a client device. The method includes encoding first image data using dedicated circuitry to produce encoded first image data and transmitting the encoded first image data to the client device. An input control signal that is generated during execution of an interactive application program is received from the client device. In response to receiving the input control signal, switching from encoding the first image data using the dedicated circuitry to encoding second image data using at least one software encoder engine to produce encoded second image data and transmitting the encoded second image data to the client device.

One advantage of the disclosed approach is that an interactive application program executed on a client device may receive image data that is rendered and encoded by a remote server system, decode and display the image data at an interactive frame rate. The latency incurred for encoding and decoding image data is reduced whenever an input signal is received from the client so that a user is not exposed to the encoding latency when interacting with the application program. Therefore, the user does not experience slowing of the frame rate of images displayed on the client, as is frequently experienced in conventional systems when the user interacts with a game application. The reduction in latency is achieved by dynamically switching between a hardware implemented encoding technique and a software implemented encoding technique.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

One embodiment of the present invention sets forth a system and method for encoding rendered image data for transmission to a client device. The rendered image data is encoded by a server computing device and transmitted to a remote client device that executes an interactive application program. The client device decodes and displays the image data and, when the user interacts with the application program, the client device provides input control signals to the server computing device. When input control signals are received by the server, the latency incurred for encoding and/or decoding the image data is reduced. Therefore, the user does not experience inconsistencies in the frame rate of images displayed on the client when the user interacts with the application program. The reduction in latency is achieved by dynamically switching from a hardware implemented encoding technique to a software implemented encoding technique. Latency may also be reduced by dynamically switching from a hardware implemented decoding technique to a software implemented decoding technique.

System Overview

Figure 1A:
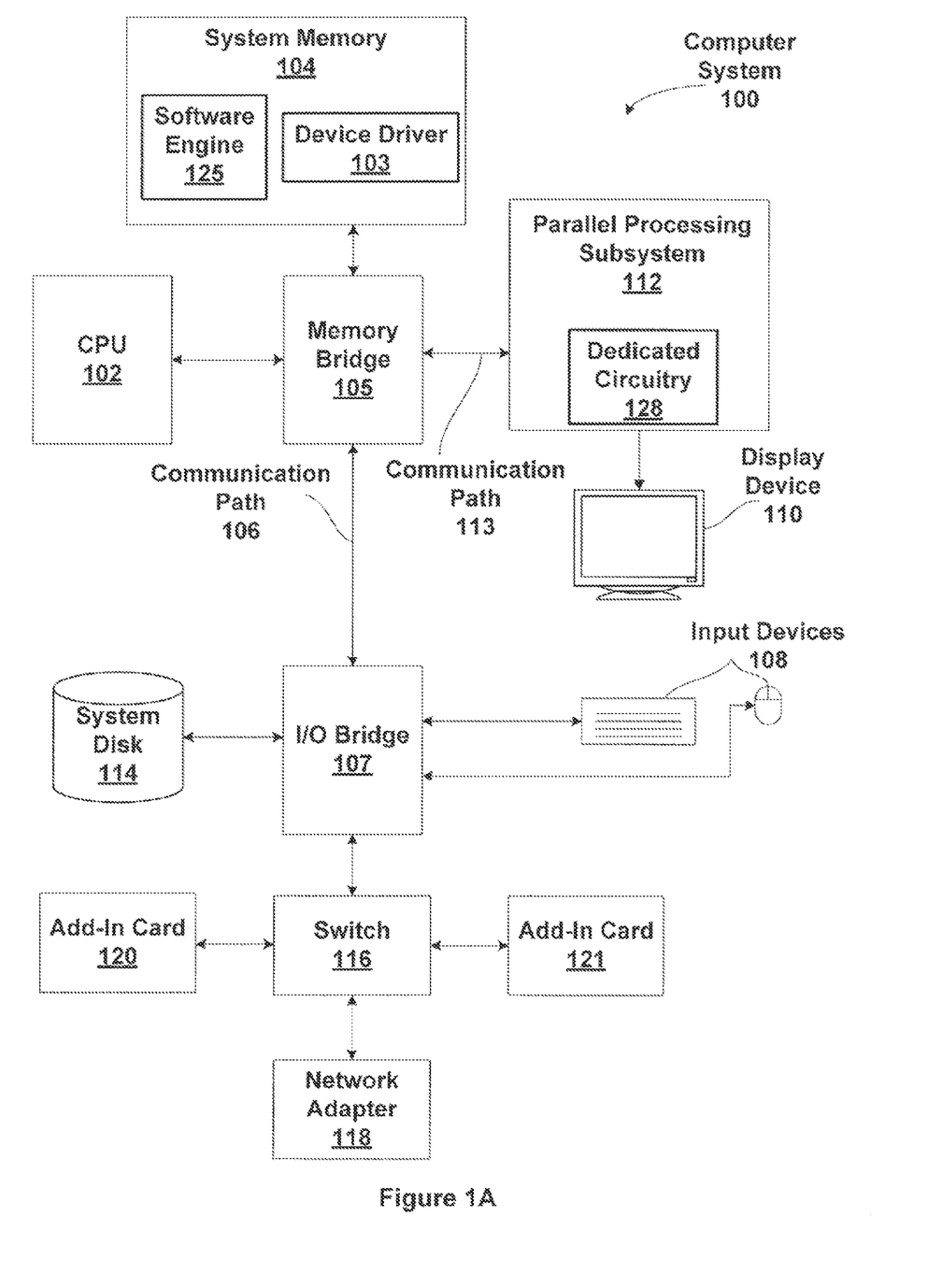
FIG. 1A is a block diagram illustrating a computer system configured to implement one or more aspects of the present invention.

FIG. 1A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse, joystick, game controller, trackball, touchscreen, and the like) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing subsystem. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In one embodiment, the parallel processing subsystem 112 includes one or more processing units that may be implemented using one or more integrated circuit devices, such as programmable processors, application specific integrated circuits (ASICs), or memory devices, or in any other technically feasible fashion. In some embodiments, some or all of the processing units in parallel processing subsystem 112 are graphic processing units (GPUs) with rendering pipelines that can be configured to perform various operations related to generating pixel data from graphics data supplied by CPU 102 and/or system memory 104 via memory bridge 105 and the second communication path 113, interacting with local parallel processing memory that is included within the parallel processing subsystem 112 (which can be used as graphics memory including, e.g., a conventional frame buffer) to store and update pixel data, delivering pixel data to display device 110, and the like. In some embodiments, parallel processing subsystem 112 may include one or more processing units that operate as graphics processors and one or more other processing units that are used for general-purpose computations. The processing units may be identical or different, and each processing unit may have a dedicated parallel processing memory device(s) or no dedicated parallel processing memory device(s). One or more processing units in parallel processing subsystem 112 may output data to display device 110 or each processing unit in parallel processing subsystem 112 may output data to one or more display devices 110.

The parallel processing subsystem 112 also includes dedicated circuitry 128 that may be configured to encode image data and/or decode encoded image data. In one embodiment, the dedicated circuitry 128 is designed to sustain throughput frame rate of 60 frames per second for encoding and/or decoding. A software engine 125 represented by program instructions for execution by the CPU 102 may also be configured to encode image data and/or decode encoded image data. The software engine 125 may be executed in parallel by one or more processing cores within the CPU 102 to perform the encoding and/or decoding operations with lower latency compared with the dedicated circuitry 128. However, when multiple processing cores within the CPU 102 execute the software engine 125 more power may be consumed compared with using the dedicated circuitry 128 to perform the same encoding and/or decoding operations.

In operation, CPU 102 is the master processor of computer system 100, controlling and coordinating operations of other system components. In particular, CPU 102 issues commands that control the operation of the processing units. In some embodiments, CPU 102 writes a stream of commands for each processing unit to a data structure (not explicitly shown in FIG. 1A) that may be located in system memory 104, parallel processing memory, or another storage location accessible to both CPU 102 and the processing units. A pointer to each data structure is written to a pushbuffer to initiate processing of the stream of commands in the data structure. A processing unit reads command streams from one or more pushbuffers and then executes commands asynchronously relative to the operation of CPU 102. Execution priorities may be specified for each pushbuffer by an application program via the device driver 103 to control scheduling of the different pushbuffers.

The parallel processing subsystem 112 communicates with the rest of computer system 100 via communication path 113, which connects to memory bridge 105 (or, in one alternative embodiment, directly to CPU 102). In one embodiment, communication path 113 is a PCI Express link, in which dedicated lanes are allocated to each processing unit within the parallel processing subsystem 112, as is known in the art. Other communication paths may also be used. The connection of parallel processing subsystem 112 to the rest of computer system 100 may also be varied.

In some embodiments, parallel processing subsystem 112 is implemented as an add-in card that can be inserted into an expansion slot of computer system 100. In other embodiments, one or more processing units can be integrated on a single chip with a bus bridge, such as memory bridge 105 or I/O bridge 107. In still other embodiments, some or all elements of the parallel processing subsystem 112 may be integrated on a single chip with CPU 102. Systems incorporating one or more processing units may be implemented in a variety of configurations and form factors, including desktop, laptop, or handheld personal computers, servers, workstations, game consoles, embedded systems, and the like.

Server-Client System for Remote Interactive Applications

Figure 1B:
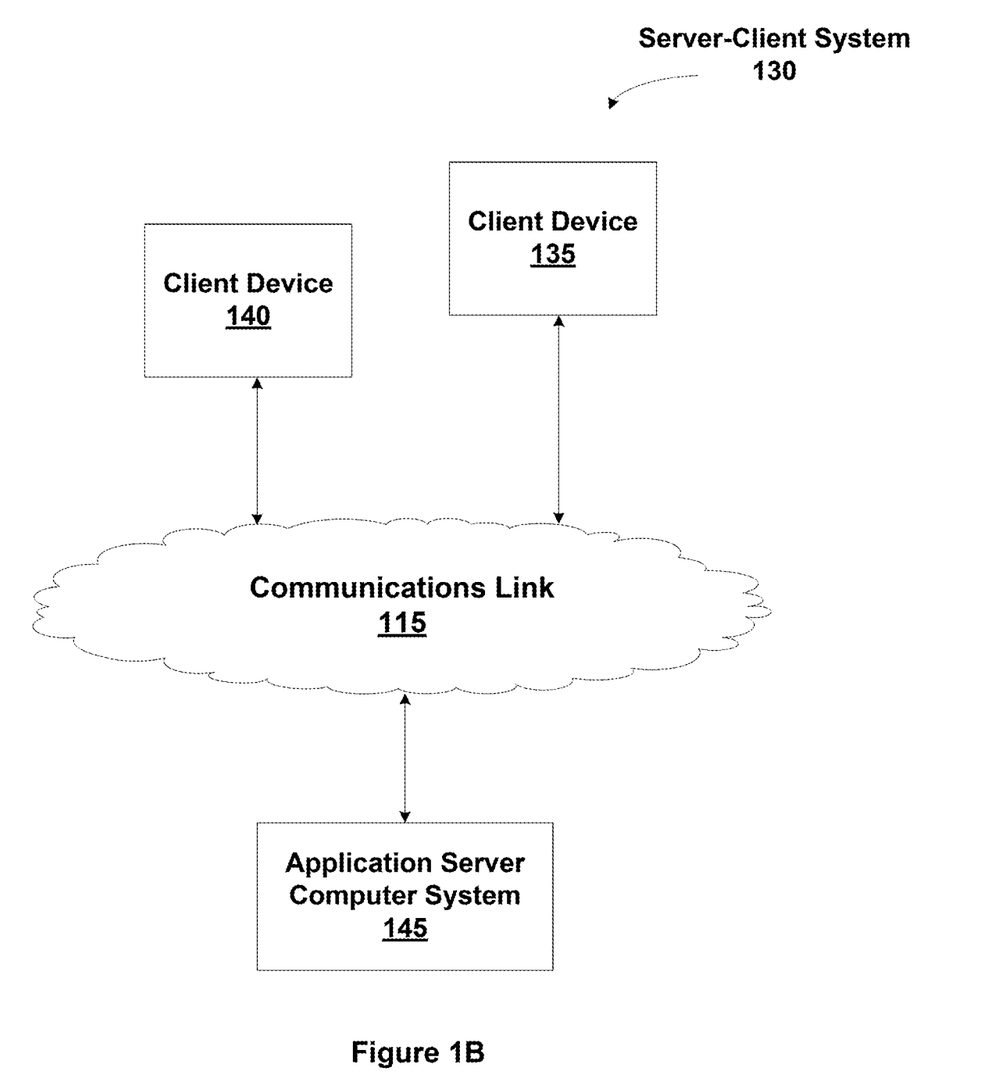
FIG. 1B is a diagram illustrating a server-client system configured to implement one or more aspects of the present invention.

FIG. 1B is a diagram illustrating a server-client system 130 configured to implement one or more aspects of the present invention. As shown, the server-client system 130 includes an application server computing system 145, a client device 140, a client device 135, and a communications link 115.

The client devices 135 and 140 may each be configured to execute a client process that communicates with an application server process executed by the application server computing system 145 via the communications link 115. The client process allows a user to remotely connect to the application server computing system 145 to cooperatively execute an interactive application program. The application server computing system 145 receives input control signals from the client devices 135 and 140 and renders image data in response to the input control signals. The input control signals are typically generated in response to user input provided via user input devices 108. To reduce the bandwidth required to transmit the image data from the application server computing system 145 to the client devices 135 and 140, the image data is encoded into a compressed format at the application server computing system 145. The encoded image data is then transmitted to, decoded, and displayed on the client device 135 and/or 140.

In operation, the server process, when initialized on the application server computing system 145, waits until a connection is initiated by the client process. When initiating a connection, the client process may transmit additional information such as the resolution of a display device (not shown) coupled to the client device 135 and/or 140. In response to a connection from the client process, the application server computing system 145 begins to collect rendered image data, encode the image data, and transmit the encoded image data to the respective client device 135 and/or 140. The transmission from the server process to the client process continues until the client process terminates the connection between the server process and the client process.

In addition, the client process collects inputs, such keyboard key strokes or mouse inputs, at the client device 135 and/or 140 and transmits the input control signals to the server process. The server process captures the received inputs and causes the inputs to effect the operation of the interactive application program executing within the application server computing system 145. For example, the user input may rotate the camera when a character in a game application looks to the right or left and, in response, the application server computing system 145 renders a scene based on the rotated camera position. The client devices 135 and 140 are configured to execute at least a portion of the interactive application program to provide the input control signals to the server process and to display image data.

The communications link 115 includes a plurality of network communications systems, such as routers and switches, configured to facilitate data communication between the client process and the server process. Persons skilled in the art will recognize that many technically feasible techniques exist for building the communications link 115, including technologies practiced in deploying the well-known internet communications network.

The application server computing system 145 and the client devices 135 and 140 may be any type of computing device including, but not limited to, a desktop personal computer (PC), a laptop, a tablet PC, a personal digital assistant (PDA) or a mobile device, such as a mobile phone. In one embodiment, the application server computing system 145 is a desktop computing system and the client devices 135 and 140 are portable devices located within the same building structure, such as a home or school.

A plurality of client devices 135 and 140, can connect to the application server computing system 145 simultaneously via corresponding client processes. In one embodiment, the server-client system 130 does not use virtualization and allows several users to simultaneously execute different game application programs on a single application server computing system 145. The users of the client devices 135 and 140 connect and interact remotely with the game application programs stored on the application server computing system 145 and console. One or more interactive application programs may be executed on the application server computing system 145 by a combination of one or more CPU and/or GPU cores to produce rendered images that are encoded and transmitted over the communications link 115.

Figure 2:
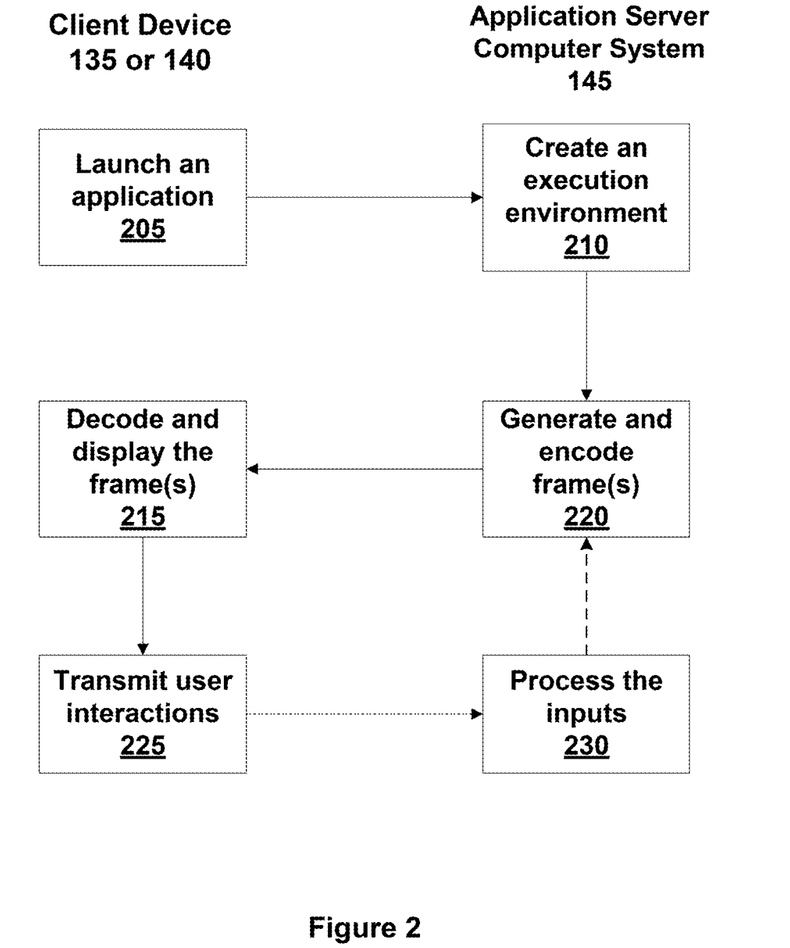
FIG. 2 is a diagram illustrating interactions between a remote client device and a server computer system, according to one embodiment of the present invention.

FIG. 2 is a diagram illustrating interactions between a client device 135 or 140 and an application server computing system 145, according to one embodiment of the present invention. Once a client device 135 or 140 is connected to the application server computing system 145, at interaction 205 the client device 135 or 140 launches an interactive application and established a connection with the application server computing system 145. When the application server computing system 145 receives the connection request, at interaction 210 the application server computing system 145 identifies the particular client and creates an execution environment to enable the interactive application program to execute on the application server computing system 145. The execution environment may also be configured to set a display resolution that is specific to the client device 135 or 140. At interaction 210 the interactive application program is also launched on the application server computing system 145.

At interaction 220 the application server computing system 145 generates rendered images that are stored in memory on the application server computing system 145 (graphics memory or system memory). The rendered images are then encoded and transmitted to the client device 135 or 140. At interaction 215 the client device 135 or 140 decodes the encoded image data that is received from the application server computing system 145 and displayed the decoded image data at the output of the client device 135 or 140. At interaction 225 the user of the client device 135 or 140 generates input control signals to control the selected application program and the input control signals are transmitted to the application server computing system 145. At interaction 230 the application server computing system 145 processes the input control signals and then proceeds to interaction 220 to generate additional images in response to the input control signals for transmission to the client device 135 or 140.

When an application program configured for playback of image data is executed, dedicated encoder circuitry that resides within the application server computing system 145 is typically used to encode the image data. The dedicated encoder circuitry is designed to maintain a frame rate of at least 60 frames per second encoding the image data. Because the control input signals are typically limited to user inputs that simply position the playback point within the content or control a sampling frequency, e.g., rewind, fast-forward, play, pause, and the like, it is not necessary to minimize the latency incurred to encode the image data. Users of playback application programs are accustomed to tolerating a delay (latency) when playing, reversing, or fast-forwarding the content.

When the dedicated encoder circuitry performs the encoding, the rendered image data is first stored in a buffer in graphics memory by a GPU. The GPU then reads the image data from the buffer and converts the image data from RGB format (red-green-blue) to a YUV format to reduce the number of bits that represent each pixel. For an n×m pixel frame, a 32 bit per pixel RGB format requires n×m×4 bytes compared with a 4:2:0 YUV format that requires (n×m×3)/2 bytes. The GPU then stores the YUV format image data in another buffer in the graphics memory. As shown in FIG. 1A, the dedicated circuitry 128 resides within the parallel processing subsystem 112. In other embodiments, the dedicated encoder circuitry resides in a device or sub-system that is separate from the parallel processing subsystem 112, such as the memory bridge 105, I/O bridge 107, or add-in cards 120 or 121.

The dedicated encoder circuitry 128 may be configured to encode the image data using a standard technique based on forward references. Techniques based on forward references compute an encoded frame using image data from frames before and after (in time) the encoded frame. Compared with other standard techniques that are not based on forward references, i.e., techniques that only uses image data from frames before the encoded frame, the latency is even greater when forward referencing is used. Latency is incurred to wait for later frames when encoding and latency is also incurred to wait for the later encoded frames when decoding. When latency-insensitive application programs are executed, the dedicated encoder circuitry 128 (and dedicated decoder circuitry) may be configured to implement a standard technique that is based on forward references.

In contrast with users of playback application programs, users of game applications are accustomed to low latency so that the game application has a quick response time and is interactive. When a user is not interacting with the game application, i.e., input control signals are not being generated, a higher latency is tolerated because the game application functions in the manner similar to a playback application. As shown in FIG. 2, when input control signals are not generated, latency is introduced only by the interaction 220 (generating and encoding the frames), the transmission of the encoded frames, and the time needed to decode and display the decoded frames. When input control signals are generated, additional latency is introduced by the interaction 225 to transmit the user interactions and interaction 230 to process the input control signals.

To compensate for the increased latency that is introduced when a user interacts with the game application, the application server computing system 145 is configured to dynamically reduce the latency incurred during encoding of the image data. The application server computing system 145 reduces the encoding latency by using a different mechanism to perform the encoding. Additionally, an encoding technique may be used that does not rely on forward references.

The different mechanism is a software encoder engine that is embodied as a set of program instructions, shown as engine 125 in FIG. 1A. The program instructions are executed by the CPU 102 to produce encoded image data. Typically, the software encoder engine 125 reads RGB data that is stored in either graphics memory or system memory 104 by the GPU, converts the RGB data to YUV data, and then encodes the YUV data to produce the encoded image data. The software encoder engine 125 does not necessarily store the YUV data in system memory 104 or graphics memory. Therefore, latency is reduced because the YUV data is not written to or read from memory as part of the encoding process.

Similarly, on the decoding side, a software decoder engine 125 is embodied as a set of program instructions, shown as engine 125 in FIG. 1A when the computer system 100 is a client device. The program instructions are executed by the CPU 102 to produce decoded image data. Typically, the software decoder engine 125 does not buffer any intermediate results produced during the decoding process. In other words, the software decoder decodes the encoded image data as it is received and stores the decoded image data directly into a frame buffer for output to the display device 110. To compensate for the increased latency that is introduced when a user interacts with the game application, the client device 135 or 140 may be configured to dynamically reduce the latency incurred during decoding of the encoded image data. The client device 135 or 140 reduces the decoding latency by using a different mechanism to perform the decoding. In one embodiment, the client device 135 or 140 switches from decoding using the dedicated decoding circuitry 128 to using the software decoder engine 125 to reduce the decoding latency.

When the user has not interacted with the game application for a time duration (fixed or programmable), the application server computing system 145 is configured to dynamically switch from encoding the image data using the software encoder engine 125 to reduce the encoding latency to using the dedicated encoding circuitry 128. Similarly, the client device 135 or 140 may also switch from decoding using the software decoder engine 125 to reduce the decoding latency to using the dedicated decoding circuitry 128.

Figure 3:
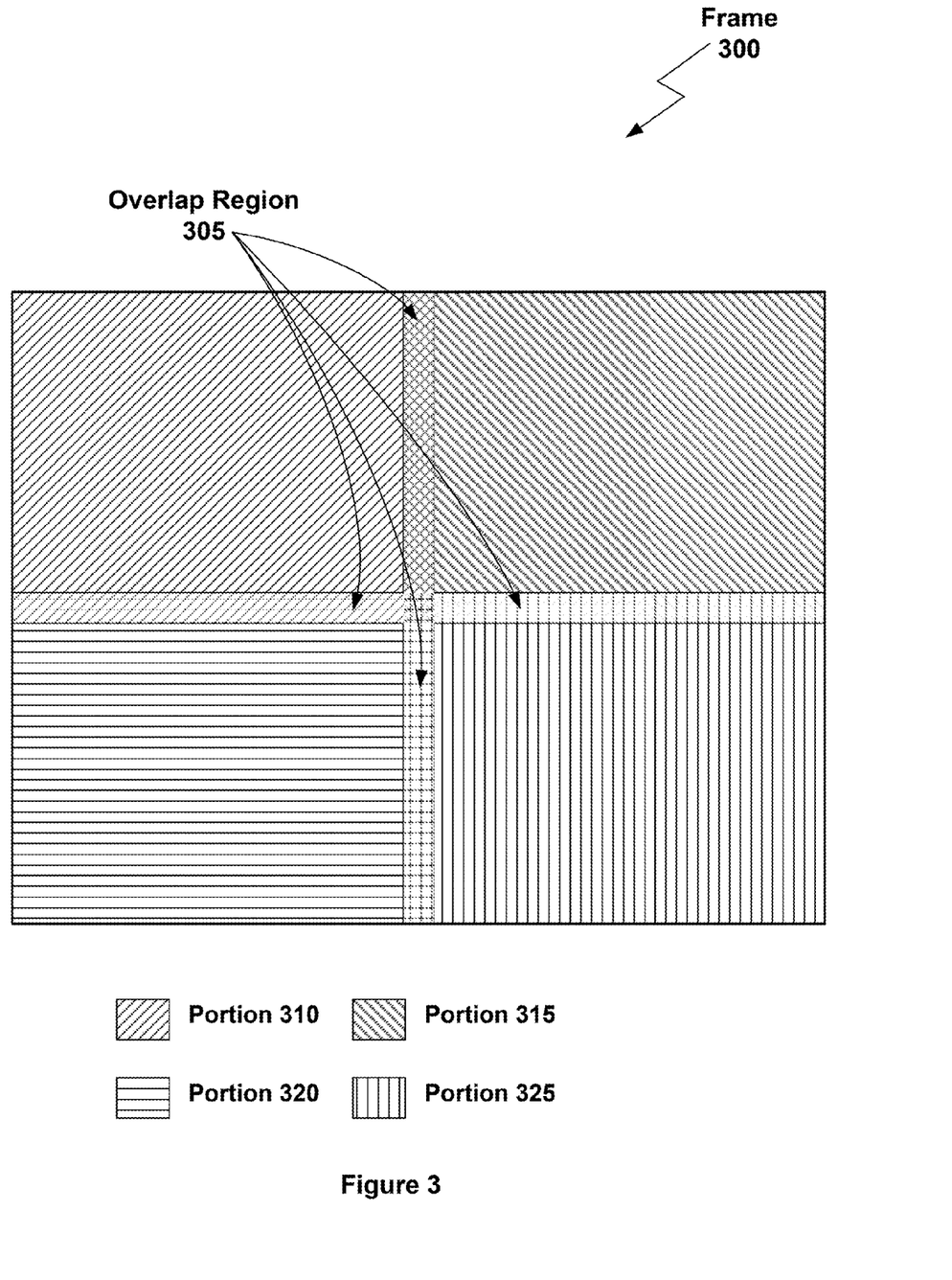
FIG. 3 is a diagram illustrating overlapping portions of a frame that are encoded and decoded, according to one embodiment of the present invention.

FIG. 3 is a diagram illustrating overlapping portions of a frame 300 that are encoded and decoded, according to one embodiment of the present invention. The latency incurred to decode or encode image data may be reduced by dividing a frame that includes image data into two or more portions. As shown in FIG. 3, the frame 300 is divided into four portions, a portion 310, 315, 320, and 325.

The encoding and decoding operations quantize the image data and the same color value in two different portions may be quantized to different values. As a result, pixels on either side of a boundary between two portions that should have the same value may have different values after being encoded and decoded. The different values appear as a visual artifact to a user viewing the decoded image data for the frame 300. The visual artifacts may be reduced by overlapping each of the portions by at least one pixel in the horizontal and vertical directions, producing the overlap region 305. The remote application server computing device 145 may be configured to encode partially overlapping portions of each frame to reduce the visual artifacts resulting from quantization during the encoding process.

At the client 135 and 140, the encoded portions of each frame are decoded and then combined to generate the decoded image data from each frame. The decoded portions may be combined using a blend operation to compute interpolated values for each pixel in the overlap region 305. Blending reduces the visual artifacts introduced by quantization. When the different portions of the frame 300 do not overlap, the decoded portions may be combined without blending.

Figure 4A:
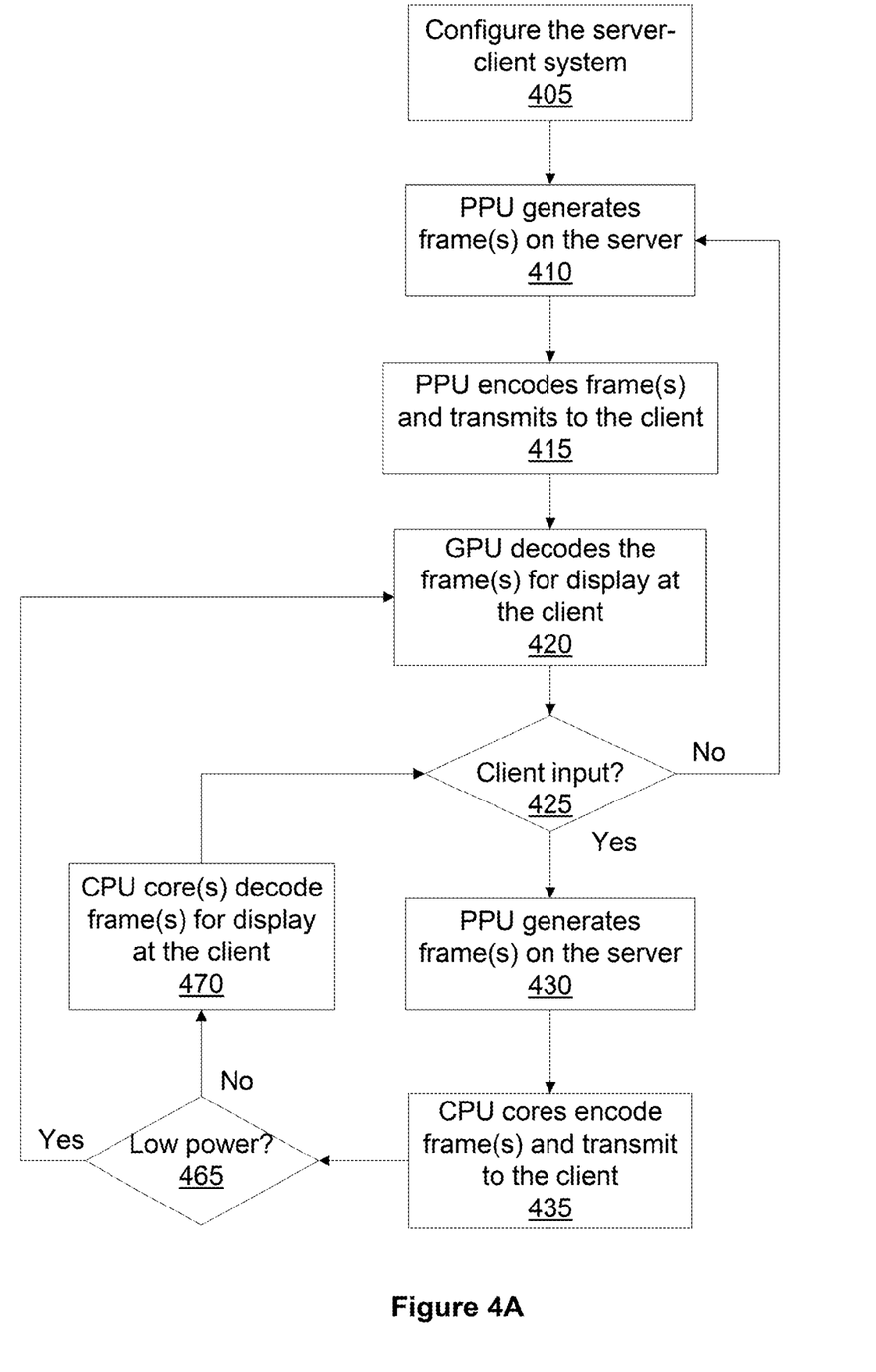
FIG. 4A is a flow diagram illustrating a technique for encoding, transmitting from server computer to a client device, and decoding rendered image data, according to one embodiment of the present invention.

FIG. 4A is a flow diagram illustrating a technique for providing rendered image data generated during execution of an application program designed to operate in a fullscreen display mode by an application server computing device 145 to a client device 135 or 140, according to one embodiment of the present invention. Although the method steps are described in conjunction with the systems of FIGS. 1A, 1B, and 2, persons of ordinary skill in the art will understand that any system configured to perform the method steps, in any order, is within the scope of the inventions.

At step 405 the client device 135 or 140 launches an interactive application program and establishes communication with a remote application server computing device 145 and the server-client system is configured. As part of the configured the application server computing system 145 creates an execution environment for the interactive application program. At step 410 a first scene that is associated with the interactive application program is rendered by the application server computing system 145 to generate the first image data. Typically, the rendering process is performed by a GPU within the application server computing system 145.

At step 415, the dedicated encoding circuitry 128 within the application server computing system 145 encodes the first image data to produce encoded first image data that is transmitted to the client device 135 or 140. At step 420 the client device 135 or 140 receives the encoded first image data and decoding the encoded first image data using the dedicated decoding circuitry 128 residing within the client device 135 or 140 to produce decoded first image data. The decoded first image data is then displayed at the client device 135 or 140.

At step 425, the application server computing system 145 determines if an input control signal generated during execution of an interactive application program is received from the client device 135 or 140, and, if not, at step 428 the application server computing system 145 determines if a time duration that is reset whenever an input control signal is received has expired.

When the time duration has expired, the application server computing system 145 returns to step 410 to generate one or more additional frames of image data. The time duration will seem to have expired when the application server computing system 145 is configured to encode the image data using the dedicated encoder circuitry 125 because the timer will not have been reset in response to receiving an input control signal. When the application server computing system 145 is configured to encode the image data using the software encoder engine 128, expiration of the timer will cause the application server computing system 145 to switch back to encode subsequent image data using the dedicated encoder circuitry 125.

When the time duration has not expired at step 428, the application server computing system 145 proceeds to step 430. When the application server computing system 145 determines that an input control signal is received at step 425, the application server computing system 145 also proceeds to step 430. At step 430, the interactive application program is executed by the application server computing system 145 to process the input control signal. At step 430 new frames of image data, second image data, are generated in response to the input control signal. Typically, the second image data is stored in system memory 104 so that the software encoder engine 125 can quickly read the second image data. At step 435 the software encoder engine 125 is executed by one or more processing cores in the CPU 102 to encode the second image data, generating encoded second image data that is transmitted to the client device 125 or 140.

When an input control signal is received and the application server computing system 145 is configured to encode image data using the dedicated encoding circuitry 128, the application server computing system 145 dynamically switches from encoding the first image data using the dedicated circuitry 128 to encoding second image data using the software encoder engine 125, where the software encoder engine 125 may be executed by one or more processing cores.

At step 465 the client device 135 or 140 determines if a low power consumption mode is enabled to minimize power consumption, and, if so, the client device 135 or 140 continues to decode the encoded image data using dedicated decoding circuitry 128. If, at step 465 the client device 135 or 140 determines that a low power consumption mode is not enabled, then at step 470 the client device 135 or 140 decodes the encoded second image data using the one or more software residing within the client device 135 or 144 to produce decoded second image data and then returns to step 425. Note that the client devices 135 and 140 are also configured to dynamically switch between using the dedicated decoding circuitry 128 and the software decoder engine 125. However, the client devices 135 and 140 differ from the application server computing system 145 in that the client devices 135 and 140 dynamically switch in response to generating an input control signal and a low power consumption mode.

Figure 4B:
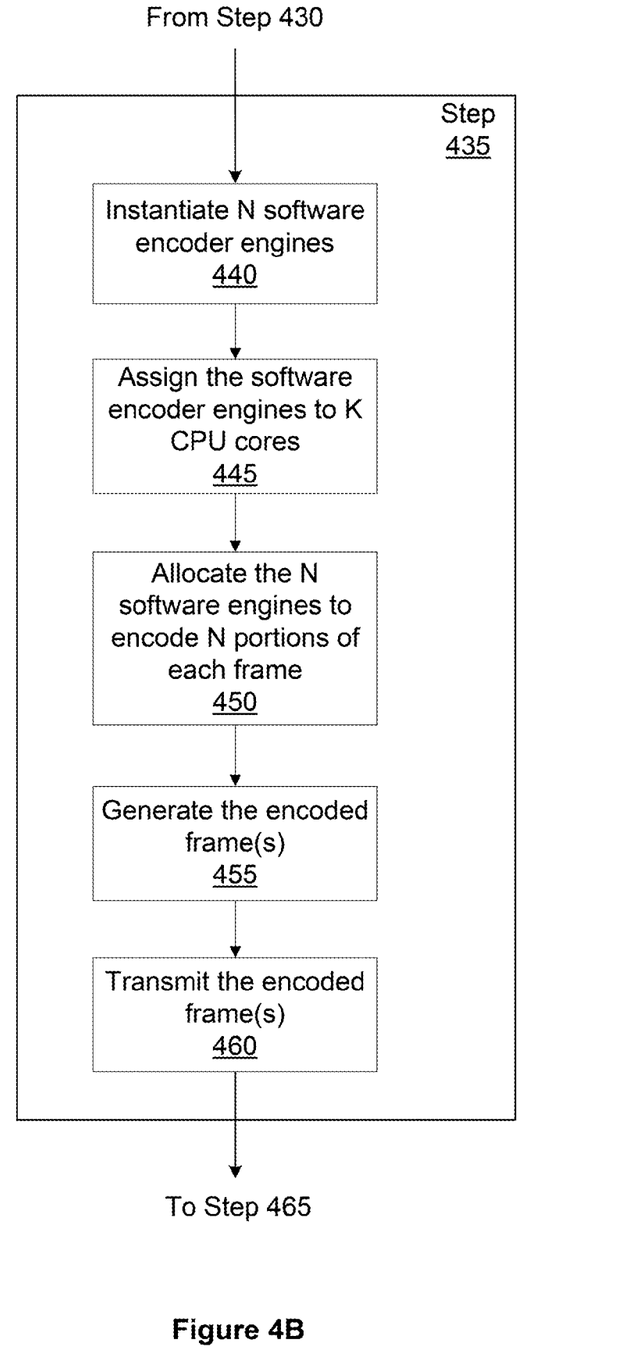
FIG. 4B is a flow diagram illustrating a step shown in FIG. 4A, according to one embodiment of the present invention.

FIG. 4B is a flow diagram illustrating the step 435 shown in FIG. 4A, according to one embodiment of the present invention. Although the method steps are described in conjunction with the systems of FIGS. 1A, 1B, and 2, persons of ordinary skill in the art will understand that any system configured to perform the method steps, in any order, is within the scope of the inventions.

At step 440 N (N is an integer ≥1) software encoder engines 125 that each encode a respective portion of the image data for each frame are instantiated. At step 445 each instantiated software engine 125 is assigned to one of K (K is an integer ≥1) processing cores within the CPU 102. At step 450 the N software encoder engines are allocated to process N portions of each frame. At step 455 the N software encoder engines 125 are executed in parallel to generate encoded frames of image data. At step 460 the encoded image data are transmitted to the client device 125 or 140.

Figure 4C:
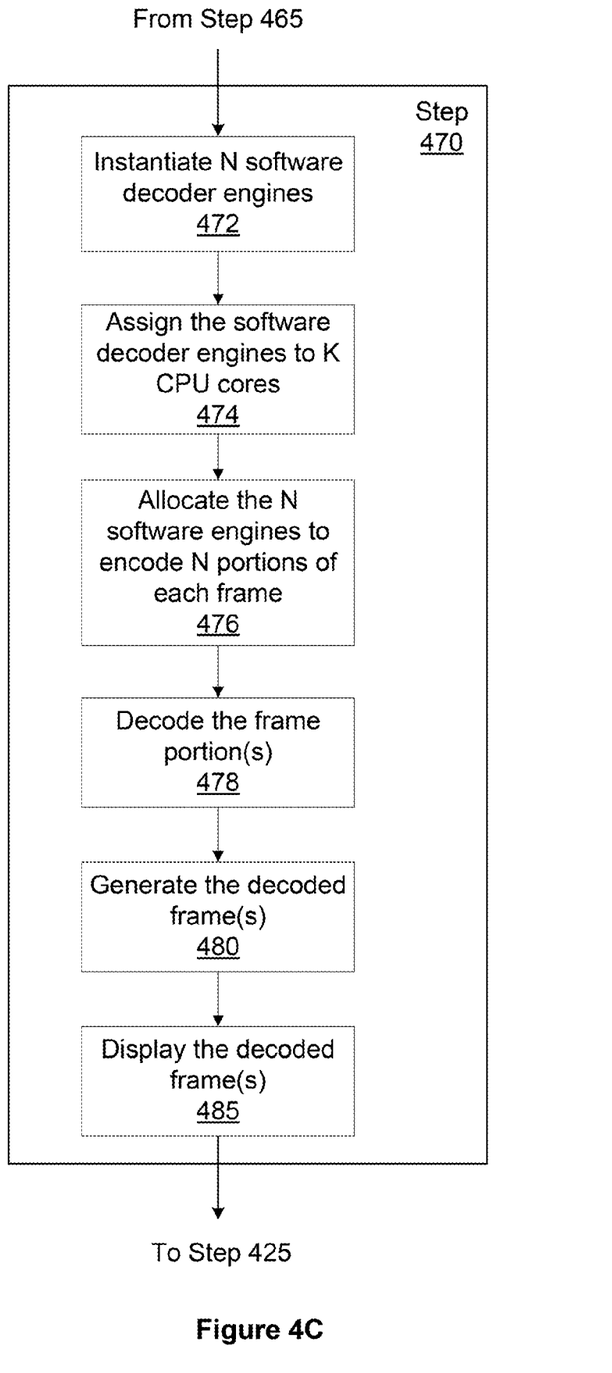
FIG. 4C is a flow diagram illustrating another step shown in FIG. 4A, according to one embodiment of the present invention.

FIG. 4C is a flow diagram illustrating the step 470 shown in FIG. 4A, according to one embodiment of the present invention. Although the method steps are described in conjunction with the systems of FIGS. 1A, 1B, and 2, persons of ordinary skill in the art will understand that any system configured to perform the method steps, in any order, is within the scope of the inventions.

At step 472 N (N is an integer ≥1) software decoder engines 125 that each encode a respective portion of the image data for each frame are instantiated. At step 474 each instantiated software decoder engine 125 is assigned to one of K (K is an integer ≥1) processing cores within the CPU 102. At step 476 the N software decoder engines are allocated to process N portions of each frame and generate decoded image data. At step 478 the N software encoder engines 125 are executed in parallel to generate decoded portions for each frame. At step 480, for each frame, the decoded portions are combined to generate decoded image data for each frame. In one embodiment the decoded portions are blended to generate the decoded image data. At step 485 the decoded image data is displayed at the client device 135 or 140.

In sum, when an input control signal is received from a remote client device, the server system dynamically switches to use a lower latency encoding mechanism so that the frame rate is not slowed and an interactive frame rate is maintained. The latency incurred for producing the encoded image data is reduced by employing a software encoding engine that is faster relative to hardware encoding circuitry.

One advantage of the disclosed approach is that an interactive application program executed on a client device may receive image data that is rendered and encoded by a remote server system, decode and display the image data at an interactive frame rate. The client device may further increase the frame rate by decoding the encoded image data using a lower latency decoding mechanism when the user interacts with the application program causing the client device to generate input control signals.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for encoding image data for transmission to a client device, the method comprising:
    encoding first image data using dedicated circuitry to produce encoded first image data;
    transmitting the encoded first image data to the client device;
    receiving, from the client device, an input control signal that is generated during execution of an interactive application program;
    switching, in response to receiving the input control signal, from encoding the first image data using the dedicated circuitry to encoding second image data using at least one software encoder engine to produce encoded second image data; and
    transmitting the encoded second image data to the client device.

2. The method of claim 1, wherein encoding the second image data using at least one software encoder engine comprises:
    instantiating a first software encoder engine that encodes a first portion of the second image data;
    instantiating a second software encoder engine that encodes a second portion of the second image data;
    executing, by a first processing core, the first software encoder engine to produce a first portion of the encoded second image data; and
    executing, by a second processing core, the second software encoder engine to produce a second portion of the encoded second image data.

3. The method of claim 2, wherein the first portion of the second image data partially overlaps the second portion of the second image data within a frame.

4. The method of claim 1, wherein the encoded second image data comprises a first encoded portion and a second encoded portion, and further comprising:
    decoding the first encoded portion of the encoded second image data to produce a first decoded portion of the second image data;
    decoding the second encoded portion of the encoded second image data to produce a second decoded portion of the second image data; and
    combining the first decoded portion with the second decoded portion to produce decoded second image data; and
    displaying the decoded second image data at the client device.

5. The method of claim 4, wherein the first decoded portion partially overlaps the second decoded portion within a frame and combining comprises blending the first decoded portion with the second decoded portion.

6. The method of claim 1, further comprising:
    decoding the encoded first image data using dedicated circuitry residing within the client device to produce decoded first image data;
    displaying the decoded first image data at the client device;
    determining that the client device is operating in a mode that minimizes power consumption;
    decoding the encoded second image data using the dedicated circuitry residing within the client device to produce decoded second image data; and displaying the decoded second image data at the client device.

7. The method of claim 1, further comprising:
decoding the encoded first image data using the dedicated circuitry residing within the client device to produce decoded first image data;
displaying the decoded first image data at the client device;
determining that the client device is not operating in a mode that minimizes power consumption;
in response, switching from decoding the encoded first image data using the dedicated circuitry residing within the client device to decoding the encoded second image data using at least one software decoder engine on a second general purpose processor residing within the client device to produce decoded second image data; and
displaying the decoded second image data at the client device.

8. The method of claim 1, further comprising:
rendering a first scene associated with the interactive application program to generate the first image data; and
rendering, based on the input control signal, a second scene associated with the interactive application program.

9. The method of claim 1, wherein the interactive application program comprises a game application program.

10. The method of claim 1, further comprising:
determining that a time duration has expired without receiving a subsequent input control signal from the client device;
in response, switching, in response to the time duration expiration, from encoding the second image data using the at least one software encoder engine to encoding third image data using the dedicated circuitry to produce encoded third image data; and
transmitting the encoded third image data to the client device.

11. A system, comprising:
a server machine that includes:
a processor; and
a memory coupled to the processor and storing an interactive application program, and a software encoder engine;
wherein the server machine is configured to:
encode first image data using dedicated circuitry to produce encoded first image data;
transmit the encoded first image data to a client device;
receive, from the client device, an input control signal that is generated during execution of the interactive application program;
switch, in response to receiving the input control signal, from encoding the first image data using the dedicated circuitry to encode second image data using the software encoder engine to produce encoded second image data; and
transmit the encoded second image data to the client device.

12. The system of claim 11, wherein the server machines is configured to encode the second image data using the software encoder engine by:
instantiating a first software encoder engine that encodes a first portion of the second image data;
instantiating a second software encoder engine that encodes a second portion of the second image data;
executing, by a first processing core, the first software encoder engine to produce a first portion of the encoded second image data; and
executing, by a second processing core, the second software encoder engine to produce a second portion of the encoded second image data.

13. The system of claim 12, wherein the first portion of the second image data partially overlaps the second portion of the second image data within a frame.

14. The system of claim 11, wherein the encoded second image data comprises a first encoded portion and a second encoded portion, and further comprising the client device that includes:
a client processor; and
a client memory coupled to the client processor, wherein the client memory includes a software decoder engine that, when executed by the client processor, causes the client processor to generate encoded image data by:
decoding the first encoded portion of the encoded second image data to produce a first decoded portion of the second image data;
decoding the second encoded portion of the encoded second image data to produce a second decoded portion of the second image data; and
combining the first decoded portion with the second decoded portion to produce decoded second image data; and
displaying the decoded second image data at the client device.

15. The system of claim 14, wherein the first decoded portion partially overlaps the second decoded portion within a frame, and combining comprises blending the first decoded portion with the second decoded portion.

16. The system of claim 11, wherein the encoded second image data comprises a first encoded portion and a second encoded portion, and further comprising the client device that includes:
a client processor; and
a client memory coupled to the client processor, wherein the client memory includes a software decoder engine that, when executed by the client processor, causes the client processor to generate decoded image data by:
decoding the encoded first image data using dedicated circuitry residing within the client device to produce decoded first image data;
displaying the decoded first image data at the client device;
determining that the client device is operating in a mode that minimizes power consumption;
decoding the encoded second image data using the dedicated circuitry residing within the client device to produce decoded second image data; and
displaying the decoded second image data at the client device.

17. The system of claim 11, wherein the encoded second image data comprises a first encoded portion and a second encoded portion, and further comprising the client device that includes:
a client processor; and
a client memory coupled to the client processor, wherein the client memory includes a software decoder engine that, when executed by the client processor, causes the client processor to generate decoded image data by:
decoding the encoded first image data using the dedicated circuitry residing within the client device to produce decoded first image data;
displaying the decoded first image data at the client device;
determining that the client device is not operating in a mode that minimizes power consumption;

in response, switching from decoding the encoded first image data using the dedicated circuitry residing within the client device to decoding the encoded second image data using at least one software decoder engine on a second general purpose processor residing within the client device to produce decoded second image data; and displaying the decoded second image data at the client device.

18. The system of claim 11, wherein there server machine is further configured to:

render a first scene associated with the interactive application program; and render, based on the input control signal, a second scene associated with the interactive application program.

19. The system of claim 11, wherein the interactive application program comprises a game application program.

20. A non-transitory computer readable medium storing instructions that, when executed by a processor, cause the processor to transmit encoded image data to a client device, by performing the steps of:

causing first image data to be encoded using dedicated circuitry to produce encoded first image data;

causing the encoded first image data to be transmitted to the client device;

receiving, from the client device, an input control signal that is generated during execution of an interactive application program;

causing, in response to receiving the input control signal, encoding to be switched from encoding the first image data using the dedicated circuitry to encoding second image data using at least one software encoder engine to produce encoded second image data; and causing the encoded second image data to be switched to the client device.

* * * * *